United States Patent [19]
Glancey et al.

[11] Patent Number: 5,784,871
[45] Date of Patent: Jul. 28, 1998

[54] AUTOMATED CONTROL SYSTEM FOR VEGETABLE HARVESTERS

[75] Inventors: James Glancey, Chesapeake City, Md.; Keith Carlilse, Greenwood; Michael Dukes, Wilmington, both of Del.

[73] Assignee: University of Delaware, Newark, Del.

[21] Appl. No.: 731,184

[22] Filed: Oct. 10, 1996

[51] Int. Cl.$^6$ .............................. A01D 43/06; A01D 90/00
[52] U.S. Cl. .................. 56/327.1; 56/16.6; 56/328.1; 56/473.5; 460/8; 414/528
[58] Field of Search .............. 56/327.1, 10.2 G, 56/16.6, 473.5, DIG. 5, 10.2 R, 328.1, 340.1; 460/8, 23, 119, 149, 150, 901; 414/501, 528

[56] References Cited

U.S. PATENT DOCUMENTS

| | | |
|---|---|---|
| 3,527,304 | 9/1970 | Wilde et al. |
| 3,603,067 | 9/1971 | Wilde |
| 4,553,381 | 11/1985 | Sonnenberg |
| 4,838,012 | 6/1989 | Bowen, III |
| 5,077,963 | 1/1992 | Harrison et al. |
| 5,103,623 | 4/1992 | Herrett .................... 56/16.6 X |
| 5,167,581 | 12/1992 | Haag ....................... 56/16.6 X |
| 5,407,390 | 4/1995 | Carney et al. ............. 460/119 |
| 5,513,484 | 5/1996 | Zehavi et al. ............. 56/16.6 |
| 5,584,762 | 12/1996 | Buhler et al. ............. 460/119 |

Primary Examiner—Terry Lee Melius
Attorney, Agent, or Firm—Connolly & Hutz

[57] ABSTRACT

The invention herein provides an improved machine for mobile harvesting vegetables comprising a frame adapted to be connected to a tractor, and a collection bin mounted to the frame for collecting vegetables as they are harvested. The improvement comprises an automated control system for moving the vegetables relative to the frame in accordance with the position and amount of vegetables collected and for controlling the speed of such movement. Movement of the vegetables may be accomplished in a variety of ways, including moving a movably mounted collection bin or by moving an internal conveyor located in a collection bin.

20 Claims, 5 Drawing Sheets

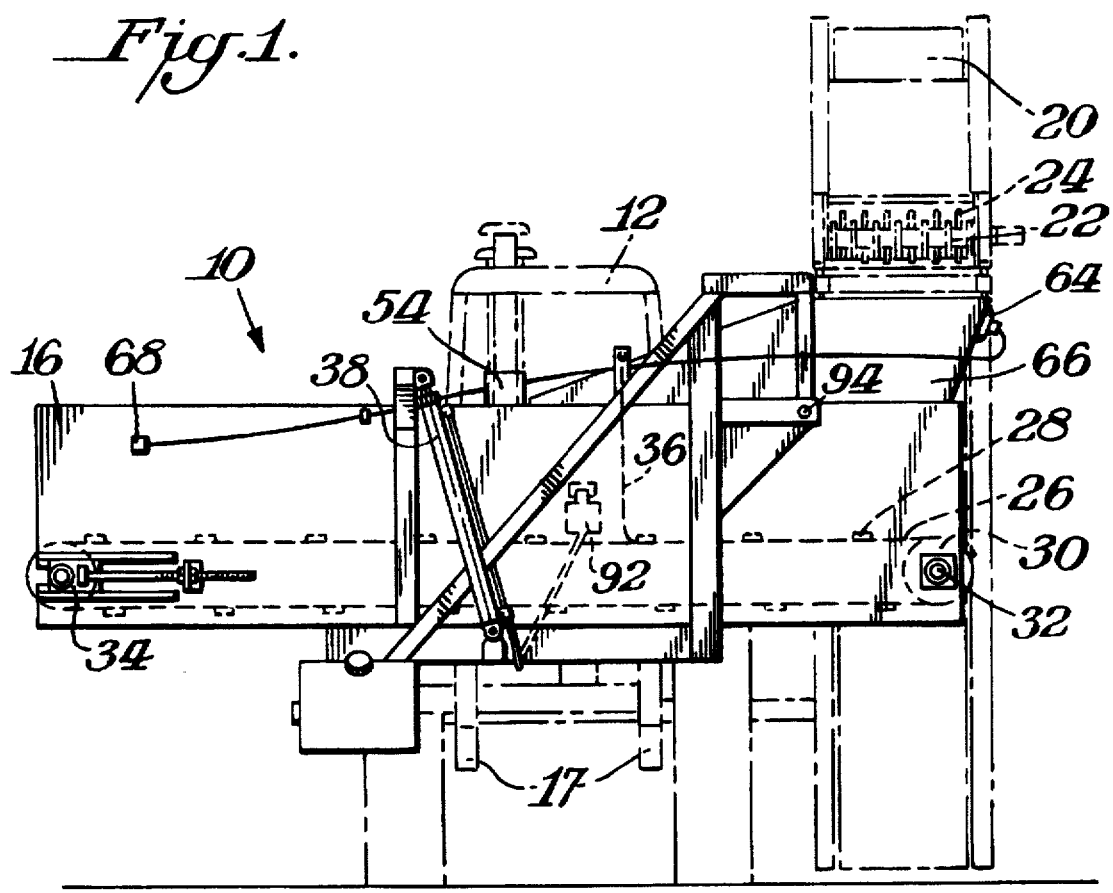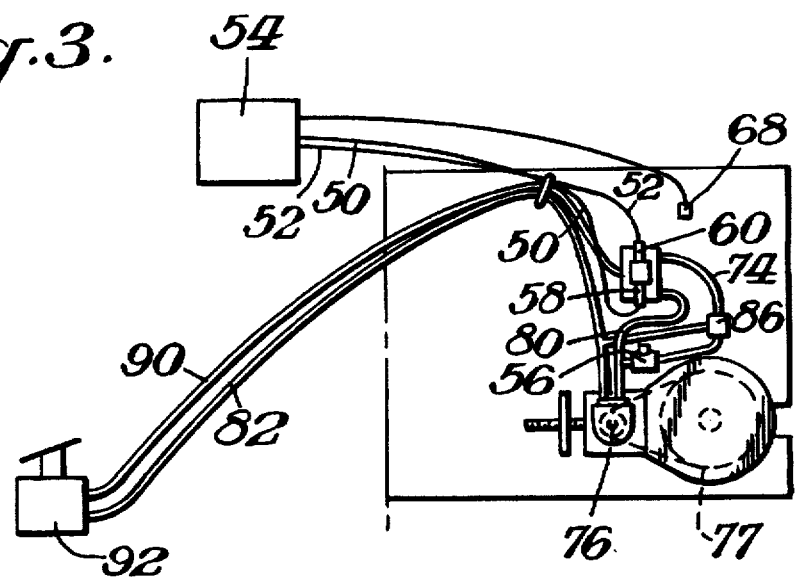

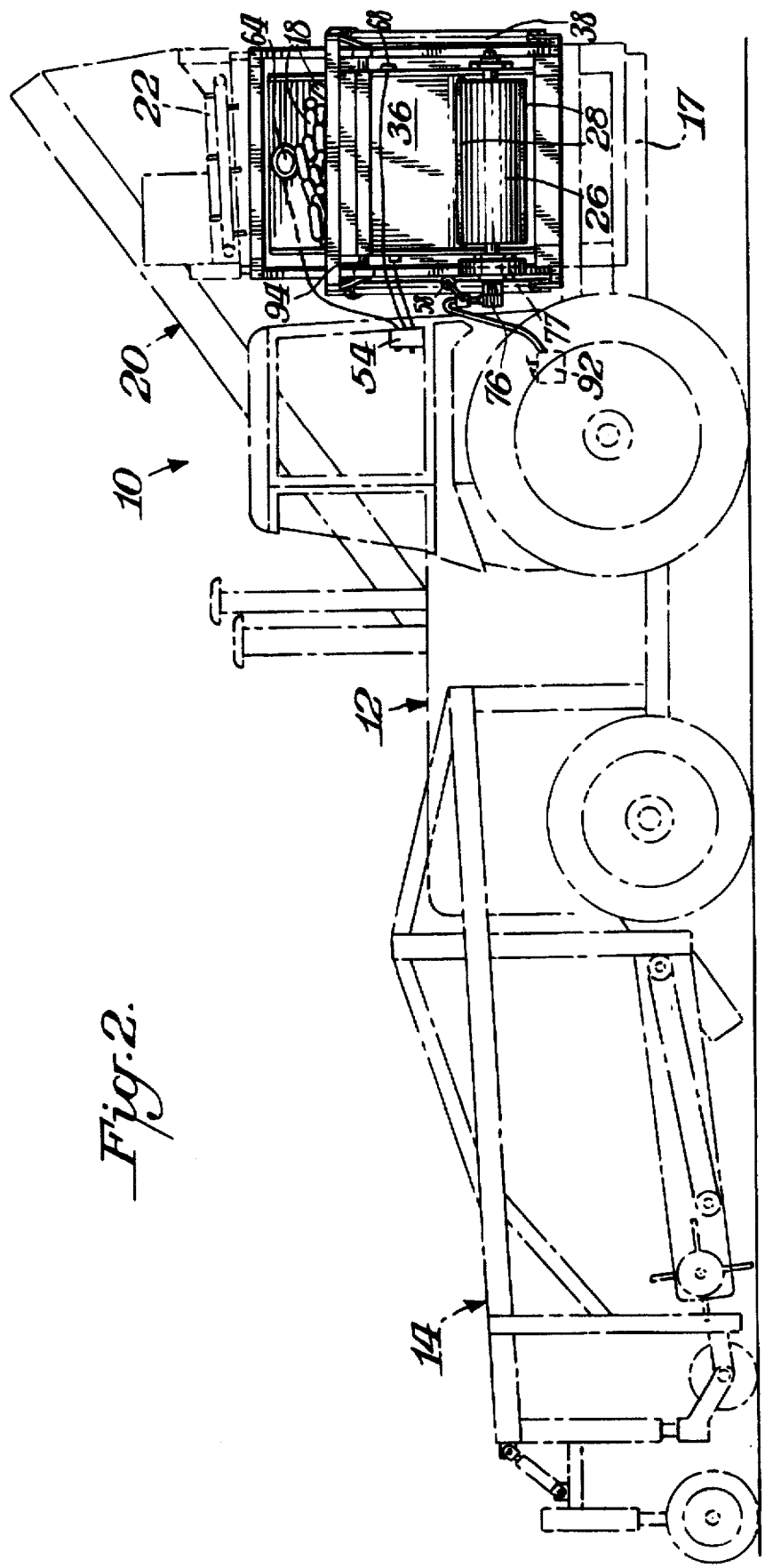

AUTOMATED CONTROL SYSTEM FOR VEGETABLE HARVESTERS

FIELD OF THE INVENTION

This invention relates to vegetable harvesting equipment. This invention specifically relates to vegetable harvesting equipment wherein the harvester is equipped with a system to automatically advance and/or reposition the vegetables as they are harvested to prevent overfilling and unnecessary damage.

BACKGROUND

Generally, machines for harvesting vine crops work by removing the vines from the ground and then stripping off the crop. These machines may work by either cutting the vines from the root (so-called "once-over" harvesting systems) or not cutting from the root. Most harvesting machines are tractor mounted, and are designed to harvest a specific type of vegetable crop.

Many vegetable harvesting machines are known in the art. By way of example, U.S. Pat. No. 3,603,067 discloses a vegetable harvester, particularly suited to cucumber harvesting, which employs a "once-over" system. The vines are cut and snap rolls are used in conjunction with a roller for removing cucumbers from the vines.

U.S. Pat. No. 3,527,304 also discloses a machine for harvesting vine crops. Among other elements, this patent discloses the use of an auxiliary frame mounted to a standard tractor-like vehicle, wherein the auxiliary frame supports an accumulating trailer for collecting harvested vegetables.

Other manifestations of vegetable harvesting machines are known in the art. Additional examples of harvesting machines are disclosed in U.S. Pat. No. 4,553,381 for cucumber harvesting, and U.S. Pat. No. 5,077,963 for vine crop harvesting.

In harvesting vegetables it is desirable to harvest the vegetables without bruising, breaking or tearing the vegetables so they will be acceptable for market or further processing. Existing machinery to harvest vine crops often produce an unacceptably high level of damaged vegetables. Thus, there is an ongoing need to develop vegetable harvesters which reduce the amount of damaged vegetables collected.

Most collection bins on harvesting machines are operated manually. Typically, the bins are located behind the cab of a tractor, often requiring the operator to look back to view the collected vegetables and reposition the bin while driving the harvester. This system is inefficient, often causing incoming harvested product to "back-up" into grading and conveying systems on the machine. This results in overfilling of the bin and excessive damage to the harvested vegetables.

BRIEF DESCRIPTION OF THE DRAWINGS

FIG. 1 is a rear elevational view of a vegetable harvester according to a preferred embodiment of the present invention.

FIG. 2 is a left-end elevational view of the vegetable harvester in FIG. 1.

FIG. 3 is a fragmented front elevational view of the vegetable harvester in FIG. 1, illustrating the conveyor belt drive and elements of the automated control system.

SUMMARY OF THE INVENTION

Figure 4:
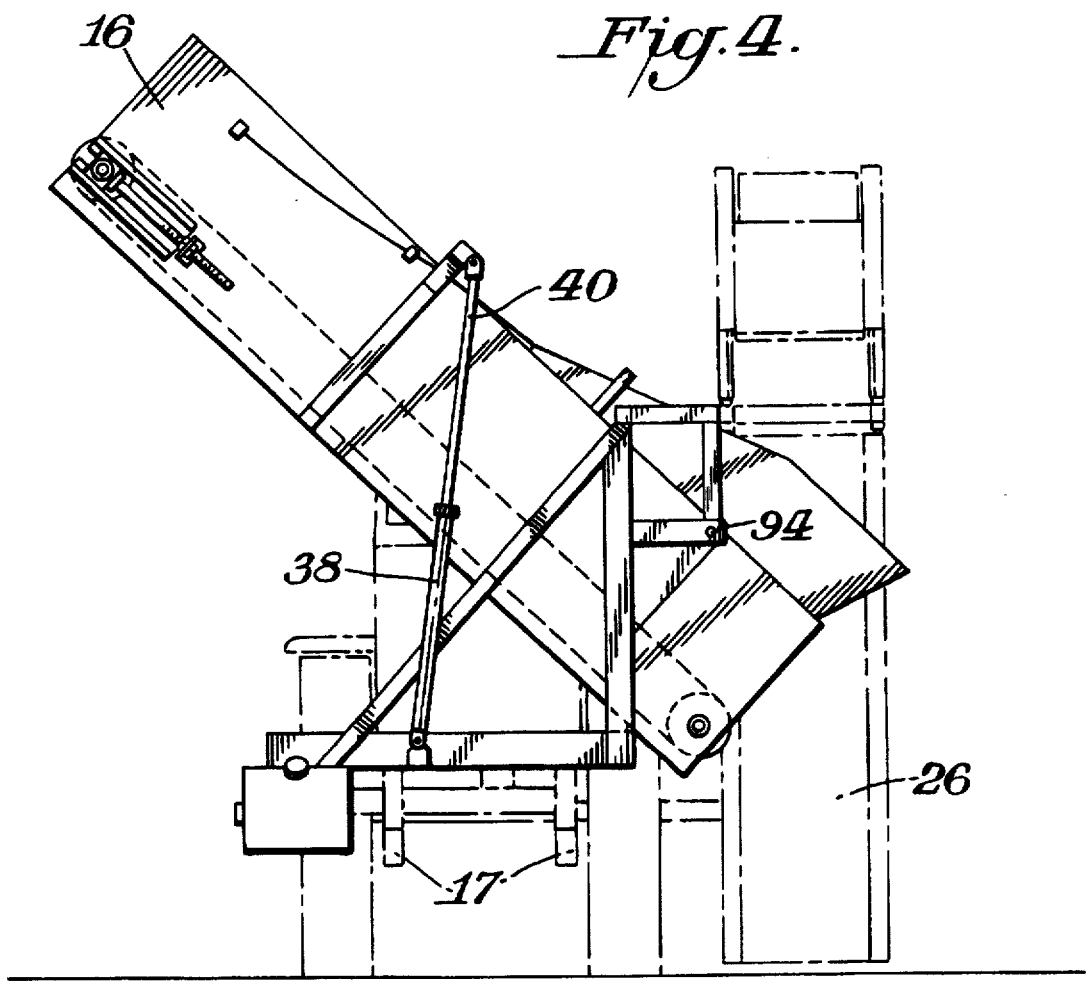
FIG. 4 is a schematic rear elevational view of the vegetable harvester in FIG. 1, illustrating the collection bin in unloading mode.

The invention provides a machine for mobile harvesting vegetables comprising, (A) a frame adapted to be connected to a tractor;

(B) a collection bin mounted to the frame for collecting vegetables as they are harvested;

wherein the improvement comprises an automated control system for moving the vegetables relative to the frame in accordance with the position and amount of vegetables collected and for controlling the speed of such movement. The vegetables may be moved relative to the frame by employing a movably mounted collection bin, or by the use of an internal conveyor located in the collection bin itself, or by other similar methods.

In a preferred embodiment, the automated control system is an electrohydraulic system comprising the following elements:

(a) electrical signal lines A and B;

(b) a manual, mode-selector switch to designate filling mode, unloading mode or manual override, which provides an electrical signal to signal line A when filling mode is chosen, an electrical signal to signal line B when unloading mode is chosen, or no signal when manual override mode is chosen;

(c) a four-way, three-position control valve, equipped with two solenoids, solenoid A and solenoid B, wherein solenoid A opens upon receiving an electrical signal from signal line A, solenoid B opens upon receiving an electrical signal from signal line B, signal line B providing an electrical signal to solenoid B when unloading mode is chosen, and wherein the control valve remains in the closed position when no signal is received;

(d) one or more level sensors to detect the vertical height, at various positions, of vegetables collected in the collection bin, which provide corresponding electrical signals;

(e) a bin control switch in signal line A, normally in the open position during harvester operation, which receives signal input from the one or more level sensors, the bin control switch closing upon receiving a signal from the one or more level sensors when a threshold level has been reached in the collection bin, and opening again when the collection bin or internal conveyor has been repositioned to a new filling position, wherein signal line A provides an electrical signal to solenoid A only when filling mode is chosen and the bin control switch is closed;

(f) an hydraulic motor for moving the movably mounted collection bin or the internal conveyor;

(g) a power unit hydraulic system for providing power to the hydraulic motor;

(h) hydraulic lines A and B, wherein each line connects the hydraulic flow from the power unit hydraulic system to the hydraulic motor when the respective solenoids are opened, and hydraulic line A contains at least one flow control valve to meter the flow of the hydraulic fluid and thus reduce the speed of the hydraulic motor;

thereby controlling the position and speed of movement of the collection bin or internal conveyor during vegetable harvesting.

It is to be understood that both the foregoing general description and the following detailed description are exemplary and explanatory only and are not restrictive of the invention, as claimed. The accompanying drawings, which are incorporated in and constitute a part of the specification, illustrate several embodiments of the invention and together with the description, serve to explain the principles of the invention.

DETAILED DESCRIPTION OF THE INVENTION

The invention provides a machine for the mobile harvesting of vegetables which can reduce the amount of vegetables damaged during harvesting as compared to conventional harvesters. The vegetable harvester of the invention herein comprises the improvement of an automated control system for automatically moving the collected vegetables as harvesting takes place, thereby avoiding overfilling and damaging the vegetables collected.

It is intended that the improvement of an automated control system be adaptable to vegetable harvesters of various configurations. The automated control system is especially suited to harvesters for vine crop vegetables, such as cucumbers, squash or peppers.

Typically, conventional harvesters are tractor mounted, though self-propelled harvesters are also commercially available. Tractor mounted harvesters usually have a frame adapted to be connected to a tractor, as well as a collection bin mounted to the frame for collecting the vegetables as they are harvested. The frame may be adapted to be pivotally mounted to a tractor, or may be permanently afixed to the tractor. It will be apparent to those skilled in the art that various modifications and variations can be made in how the frame is connected to the tractor and how the collection bin is mounted to the frame.

As well, the harvester may contain various other conventional components. For example, typical mobile harvesters for vine crop vegetables contain a vine elevating device, a separating assembly for separating vegetables from the elevated vines, a transporting assembly for conducting the vegetables from the separating assembly to the collection bin, as well as in some cases, a root severing apparatus. These are examples of the many components of conventional vegetable harvesters that may be included in an improved harvester according to the invention herein. As further examples, U.S. Pat. Nos. 3,603,067, 3,527,304, 4,553,381 and 5,077,963 disclose known harvesters and are incorporated by reference herein.

The invention herein provides a vegetable harvester with an automated control system which moves the vegetables relative to the frame, in accordance with the position and amount of vegetables collected and which controls the speed of such movement. As discussed above, vegetable harvesters typically comprise a transporting assembly, often mounted to the frame, which transports the vegetables from a picker or separating assembly to a collection bin. The transporting assembly thereby has an outlet for passing the harvested vegetables into the collection bin. Thus, by moving the vegetables relative to the frame in accordance with the invention, the vegetables are thereby also moved relative to the outlet of the transporting assembly. In this way, the vegetables are moved to avoid backing up at the outlet, and also to provide even filling of the bin.

The movement of the vegetables may be accomplished in a myriad of ways. For example, the collection bin may be movably mounted to the frame, such that the automated control system moves the collection bin-in response to the position and amount of vegetables collected. As recognized by those skilled in the art, the collection bin may be movably mounted to the frame in various ways, and is usually actuated by a device which produces linear motion, e.g. an hydraulic cylinder, a linear actuator or a conveyor. The only requirement being that movement of the collection bin moves the harvested vegetables relative to the frame, and therefore relative to the transporting assembly outlet and incoming stream of harvested vegetables, so that the incoming vegetables do not back up or overfill the collection bin.

Alternatively, the collection bin may be provided with an internal conveyor which receives the harvested vegetables. This preferred embodiment is shown in FIGS. 1 through 4, discussed in more detail below. The automated control system then moves the conveyor in response to the position and amount of vegetables collected, thereby repositioning the harvested vegetables in the collection bin while the bin may remain stationary.

Referring now to FIGS. 1 through 4, a preferred harvester per the invention herein will be described in more detail. FIG. 1 shows a rear elevational view of a cucumber harvester 10. FIG. 2 shows a left end elevational view of the cucumber harvester 10 in FIG. 1. The harvester 10 is attached to a tractor 12, having a cucumber picker 14, both shown in phantom outline form. A collection bin 16 is affixed to the rear end of the tractor 12, via a support frame 17. The collection bin 16 receives cucumbers 18 from the vegetable transporting assembly, which is shown as conveyor 20. The cucumbers 18 are typically first passed through a grader 22 having bars 24 spaced equidistantly to allow only cucumbers of a certain size to fall into the collection bin 16.

The collection bin 16 is equipped with an internal conveyor 26, preferably equipped with cleats 28 molded to it. The cleats 28 are preferably spaced equidistantly and serve to reduce slippage of the cucumbers 18 when the internal conveyor 26 is moved, thereby ensuring that the vegetables will be moved relative to the frame, and within the collection bin 16, upon action of the automated control system. The internal conveyor 26 is moved by the action of a sprocket 30 and shaft bearing 32 at one end, and tensioning shaft bearings 34 at the opposite end, powered by an hydraulic motor 76 and chain drive 77.

Optionally, the collection bin 16 may be equipped with an apron and curtain 36 which allows the incoming cucumbers 18 to back up against it and thereby proceed past the curtain only when a predetermined, preset level of cucumbers is reached. This facilitates even filling of the collection bin 16. Also, the collection bin 16 may be equipped with an hydraulic cylinder 38 and piston 40 which will allow the bin 16 to be tilted at pivot point 94 for cucumber unloading as shown in FIG. 4.

Components of the automated control system shown in FIGS. 1 through 3 include: a manual mode selector switch 54, a mechanical height sensor 64, a capacitance sensor 68, a four-way, three position, solenoid operated directional control valve 56 equipped with two solenoids, solenoid A 58 and solenoid B 60, hydraulic motor 76, electrical lines A 50 and B 52, hydraulic lines A 74 and B 80, return hydraulic line 82 and hydraulic supply line 90. These elements will be discussed in more detail below, with additional reference to FIGS. 5 and 6.

The automated control system of the invention herein may have various configurations depending on the type of power employed and other considerations. The operation of the system, however, is conceptually the same. The collection bin on a harvester is filled with harvested vegetables until a certain threshhold level is reached. This level may be detected by one or more sensors, such as mechanical switches or passive level sensors (e.g. electrical capacitance sensors) located in the collection bin. The sensor then provides an electrical signal to a process controller, or to an electrical switch, which will then allow power to flow to a motor to move the collected vegetables. The control system will also control the speed of the motor so that the movement of the vegetables is steady and slow, i.e. relative to the typically faster unloading speed. In this way the collection bin will be filled evenly and damage from overfilling or back-up of the incoming vegetables will be avoided.

In more specific terms, an automated control system may comprise the following elements. First, the system must contain an actuator for moving a movably mounted collection bin or internal conveyor, wherein such movement will correspondingly move the vegetables relative to the frame, and relative to the outlet of a transporting assembly. The system must also contain a power source for providing power to the actuator, and a variable speed drive for controlling the speed of the actuator.

In the collection bin, one or more sensors are needed to detect the vertical height and/or position of vegetables collected in the collection bin. Preferably, the sensors are located in the collection bin such that they can detect threshhold height levels of vegetables at given positions. Upon detecting a threshhold level, the sensors will then provide corresponding electric signals a process controller.

The system also comprises a manual, mode-selector switch to designate filling mode, unloading mode or manual override, which also provides an electric signal to the process controller corresponding to the mode selected. The process controller then receives signals from the one or more sensors and the manual mode-selector switch as input, processes such input, and provides an output signal to the variable speed drive indicating when the motor should run, what the speed should be, and when the motor should shut off. A system as described will control the position and speed of movement of a collection bin or an internal conveyor during vegetable harvesting.

Since most mobile harvesting machines are hydraulically powered, in a preferred embodiment the system comprises an electrohydraulic control system. Such a system is shown schematically in FIG. 5, wherein the power is provided by a closed center power unit 72, and in FIG. 6, wherein the power is provided by an open center power unit 73. The main components of such a system are also shown on a vegetable harvester per the invention in FIGS. 1 through 3.

Figure 5:
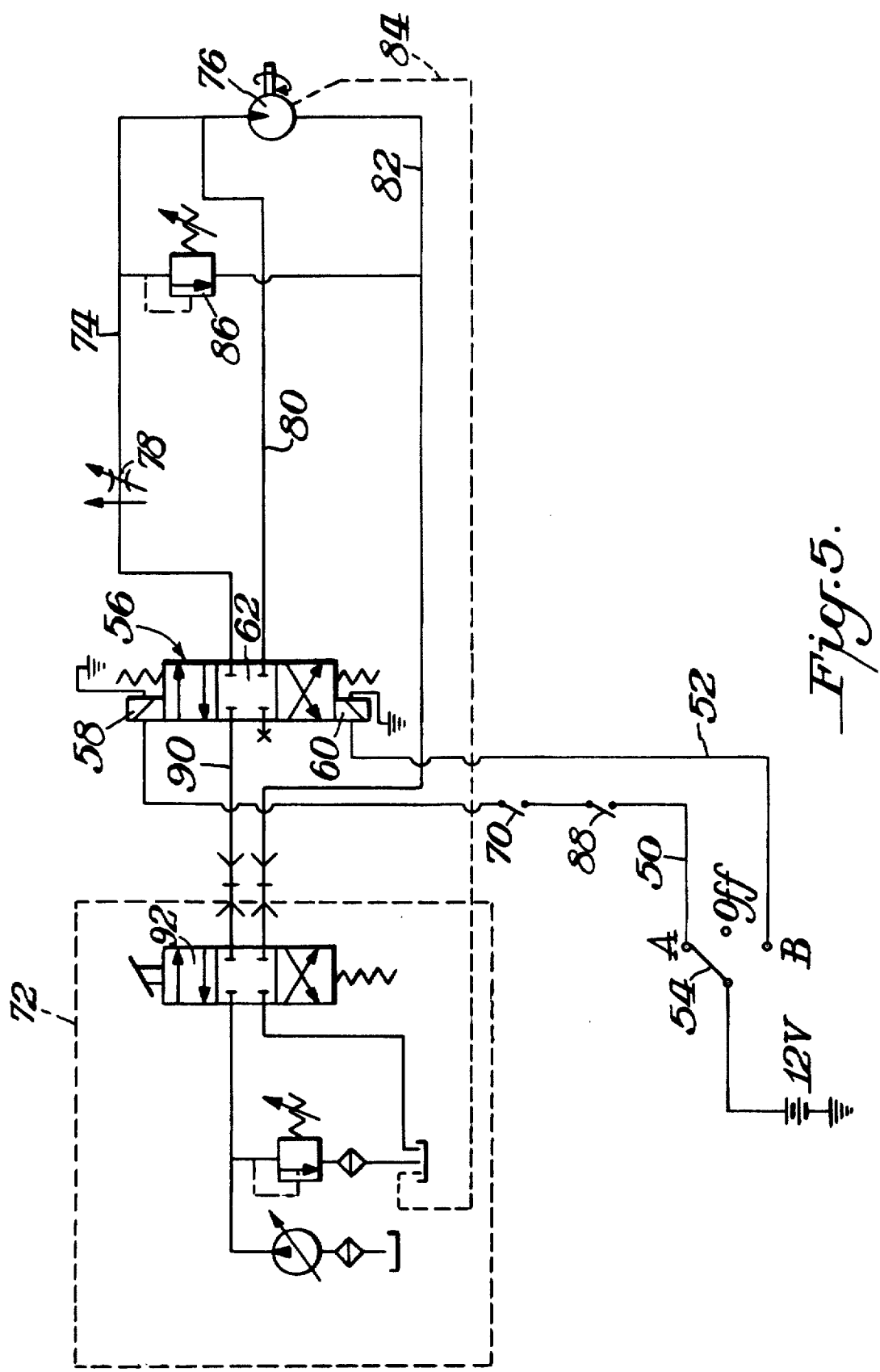
FIG. 5 is a schematic diagram of the automated control system for a closed center power unit hydraulic system according to a preferred embodiment of the present invention.
Figure 6:
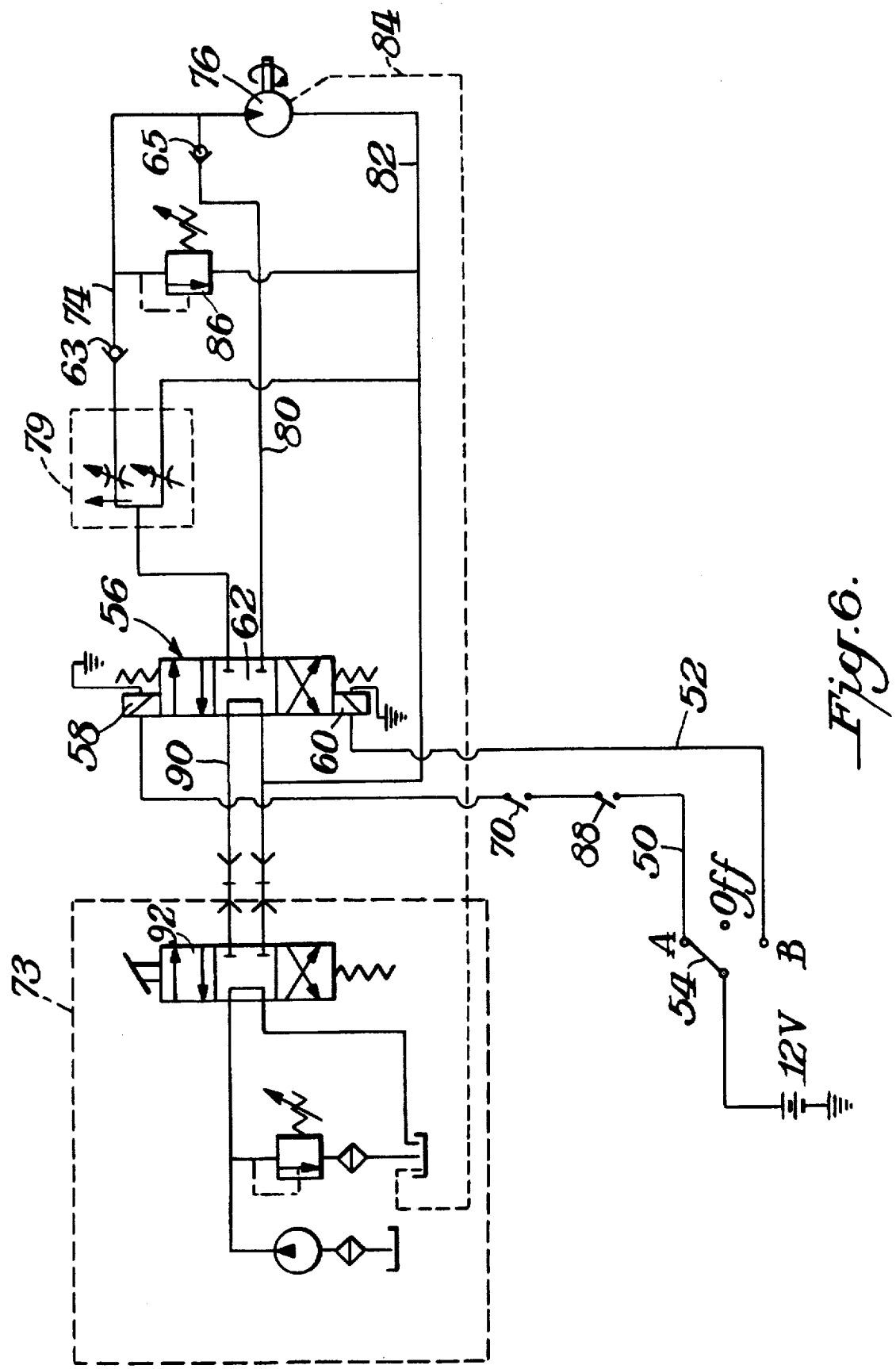
FIG. 6 is a schematic diagram of an automatic control system for an open center power unit hydraulic system according to a preferred embodiment of the present invention.

Referring now to FIGS. 5 and 6, an electrohydraulic control system will be described in more detail. The system comprises signal line A 50 and signal line B 52 which are connected to the manual mode selector switch 54. An operator uses the mode selector switch to choose filling mode, unloading mode or manual override. When filling mode is chosen, an electrical signal is provided to signal line A 50. When unloading mode is chosen, an electrical signal is provided to signal line B 52. Or, when manual override mode is chosen, no signal is provided to the automated control system.

The systems shown in FIGS. 5 and 6 also comprise a four-way (i.e. four flow pathways), three-position directional control valve 56 equipped with two solenoids, solenoid A 58 and solenoid B 60, corresponding to two positions on the three-position control valve. The third position 62 is the closed position and does not allow hydraulic power to flow, corresponding to manual override mode. Hydraulic flow is supplied to the control valve through hydraulic supply line 90. Solenoid A 58 opens upon receiving an electrical signal from signal line A 50, and solenoid B 60 opens upon receiving an electrical signal from signal line B 52.

The system also comprises one or more level sensors. The sensors may be positioned on a harvester as shown in FIGS. 1 through 3. For example, a mechanical height sensor 64 may be positioned at the filling end of the collection bin 16 in the guiding hopper 66. The mechanical height sensor may work through the action of a diaphragm which provides an electrical signal upon contact with the vegetables. Passive-type sensors, such as capacitance sensor 68, may also be used. Capacitance sensor 68 may be placed at the opposite end of collection bin 16 to detect when the bin is filled to capacity.

The sensors provide electrical signals to the bin control switch 70 in signal line A 50. The bin control switch 70 is normally in the open position. However, when a threshold level is reached in the collection bin 16, the bin control switch 70 receives a signal from the one or more level sensors and the bin control switch 70 closes. This then allows an electrical signal to flow to solenoid A 58, provided filling mode has been selected on the mode selector switch 54.

Thus, when filling mode is selected, solenoid A 58 opens upon receiving an electrical signal from the one or more levels sensors, which then moves a spool internal to the control valve and allows hydraulic power to flow from the power unit hydraulic system 72, through hydraulic supply line 90, to hydraulic line A 74 and the hydraulic motor 76. Hydraulic line A 74 contains a flow control valve 78 (shown as 79 in FIG. 6) which reduces the hydraulic flow to the motor, thereby reducing the motor's speed.

For an open center power unit as shown in FIG. 6, two flow control valves 79 arranged in parallel are used. Since the open center power unit system continuously circulates all of the system's hydraulic fluid, the parallel arrangement of flow control valves serves to split the hydraulic flow and therefore reduce the flow through hydraulic line 74 to the hydraulic motor 76, hence reducing the motor speed. In FIG. 6, hydraulic lines 74 and 80 are also provided with check valves 63 and 65. The check valves are employed to ensure the hydraulic system does not short-circuit; the valves prevent hydraulic fluid from flowing back to the power unit.

The hydraulic motor 76 receives the reduced flow of hydraulic fluid and may then move an internal conveyor 26 shown in FIGS. 1–3. Since the motor speed is reduced, vegetables, such as cucumbers 18, are slowly moved relative to the frame to allow for further filling of the collection bin 16. It should be noted that power units 72 and 73 are each equipped with a manually operated directional control valve 92 which controls whether the power unit is on or off.

Optionally, signal line A 50 may also contain an automatic shutoff switch 88 which is normally in the closed position.

The automatic shutoff switch 88 opens upon receiving an electrical signal from the one or more level sensors (e.g. capacitance sensor 68) when the collection bin is filled to capacity. In this way, signal line A 50 is interrupted and no signal can flow to solenoid A 58. This prevents further movement of the internal conveyor 26 and further filling of the collection bin 16. Signal line A may additionally provide an electrical signal to a warning indicator (located, e.g. in the tractor cabin) when the bin control switch is closed and the automatic shutoff switch is open. This would then provide an indication to an operator that the collection bin has been filled to capacity and harvesting should be stopped.

Alternatively, when unloading mode is chosen on mode selector switch 54, an electrical signal is provided by signal line B 52 to solenoid B 60. Solenoid B 60 then opens and hydraulic power flows from the power unit hydraulic system 72 or 73, through hydraulic supply line 90, to hydraulic line B 80 and the hydraulic motor 76. Hydraulic line B 80 notably does not contain a flow control valve, thus allowing unloading of the vegetables from the collection bin to occur at full motor speed.

Typically, an electrohydraulic system as shown also comprises a return hydraulic line 82 from the motor 76 to the power unit hydraulic system 72 or 73. The motor 76 preferably also has a drain line 84 which also feeds back to the power unit 72. For safety reasons, a relief valve 86 is placed in hydraulic line A 74.

Other embodiments of the invention will be apparent to those skilled in the art from consideration of the specification and practice of the invention disclosed herein. It is intended that the specification and examples be considered as exemplary only, with a true scope and spirit of the invention being indicated by the claims.

EXAMPLES

EXAMPLES and Comparative Data

Cucumber damage (culls) was measured throughout a growing season. Test samples were taken from each truck load of harvested cucumbers delivered to a cucumber processing plant. Culls were measured on a weight basis and reported as a percentage of the total sample weight. Daily averages for culls were calculated. The cucumber harvesting machines were typical tractor-mounted machines, as shown in FIGS. 1-4.

For the first 36 days, the harvesting machines were run in manual mode, without an automated control system per the invention herein. For the next 16 days, the harvesting was conducted using an electrohydraulic automated control system per the invention herein, which controlled the position and speed of movement of an internal conveyor in the collection bin. The culls percentage for each day is shown in Table I.

Figure 7:
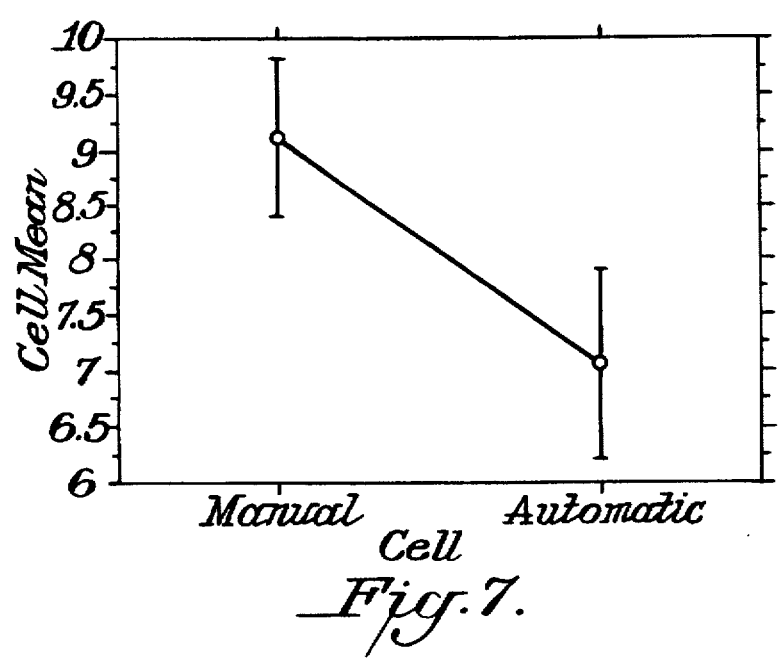
FIG. 7 is a graph depicting the percentage of culls obtained with a harvester having an automated control system per the invention herein, and that obtained using a harvester without such a control system.

The results of statistical analysis of the damage data is shown in Tables II, III and IV and in FIG. 7. Using standard analysis of variance (ANOVA) techniques, Table IV shows that the mean difference is greater than the calculated critical difference. Thus, the ANOVA results clearly indicate that the reduction in cucumber damage with the automatic bin control system was statistically significant (to a 95% certainty) when compared to the manual system.

FIG. 7 depicts an interaction line plot for the culls percentages, showing the effect of bin advance. The error bars indicate the 95% confidence interval.

TABLE I

| DAY | Culls % | Bin Advance |
|---|---|---|
| 1 | 15.0 | Manual |
| 2 | 9.0 | Manual |
| 3 | 11.0 | Manual |
| 4 | 9.0 | Manual |
| 5 | 7.0 | Manual |
| 6 | 7.0 | Manual |
| 7 | 5.0 | Manual |
| 8 | 5.0 | Manual |
| 9 | 7.0 | Manual |
| 10 | 6.0 | Manual |
| 11 | 8.0 | Manual |
| 12 | 9.0 | Manual |
| 13 | 11.0 | Manual |
| 14 | 11.0 | Manual |
| 15 | 8.0 | Manual |
| 16 | 9.0 | Manual |
| 17 | 10.0 | Manual |
| 18 | 11.0 | Manual |
| 19 | 9.0 | Manual |
| 20 | 10.0 | Manual |
| 21 | 9.0 | Manual |
| 22 | 10.0 | Manual |
| 23 | 8.0 | Manual |
| 24 | 9.0 | Manual |
| 25 | 8.0 | Manual |
| 26 | 10.0 | Manual |
| 27 | 7.0 | Manual |
| 28 | 8.0 | Manual |
| 29 | 9.0 | Manual |
| 30 | 10.0 | Manual |
| 31 | 12.0 | Manual |
| 32 | 13.0 | Manual |
| 33 | 7.0 | Manual |
| 34 | 10.0 | Manual |
| 35 | 11.0 | Manual |
| 36 | 10.0 | Manual |
| 37 | 6.0 | Automatic |
| 38 | 6.0 | Automatic |
| 39 | 6.0 | Automatic |
| 40 | 7.0 | Automatic |
| 41 | 6.0 | Automatic |
| 42 | 8.0 | Automatic |
| 43 | 6.0 | Automatic |
| 44 | 7.0 | Automatic |
| 45 | 6.0 | Automatic |
| 46 | 6.0 | Automatic |
| 47 | 7.0 | Automatic |
| 48 | 6.0 | Automatic |
| 49 | 7.0 | Automatic |
| 50 | 9.0 | Automatic |
| 51 | 8.0 | Automatic |
| 52 | 12.0 | Automatic |

TABLE II

ANOVA Table for Culls (%)

| | Degrees of Freedom | Sum of Squares | Mean Square | F-Value | P-Value |
|---|---|---|---|---|---|
| Bin Advance | 1 | 46.488 | 46.488 | 12.075 | 0.0011 |
| Residual | 50 | 192.49 | 3.850 | | |

Model II estimate of between component variance: 1.9246

TABLE III

Means Table for Culls (%)
Effect of Bin Advance

|  | Count | Mean | Std. Dev. | Std. Err |
|---|---|---|---|---|
| Manual | 36 | 9.111 | 2.095 | 0.349 |
| Automatic | 16 | 7.062 | 1.611 | 0.403 |

TABLE IV

Fisher's PLSD for Culls (%)
(Effect of Bin Advance/Significance level: 5%)

|  | Mean Difference | Critical Difference | P-Value |
|---|---|---|---|
| Manual v. Automatic | 2.0486 | 1.1841 | 0.0011 |

What is claimed is:

1. An apparatus for mobile harvesting vegetables, comprising;

a frame adapted to be connected to a tractor;

a collection bin movably mounted to the frame for collecting vegetables as they are harvested; and an automated control system for moving the vegetables relative to the frame, for moving the collection bin in accordance with the position and amount of vegetables collected and for controlling the speed of such movement, thereby repositioning the collection bin, the automated control system comprising:

an actuator for moving the movably mounted collection bin, a power source for providing power to the actuator, one or more sensors to detect the vertical height and/or position of vegetables collected in the collection bin, wherein the sensors provide corresponding electric signals, a variable speed drive to control the speed of the actuator, a manual, mode-selector switch to designate a filling mode, an unloading mode or a manual override, wherein the manual, mode-selector switch provides an electric signal corresponding to the mode selected, and a process controller which receives signals from the one or more sensors and the manual mode-selector switch as input, processes such input, and provides an output signal to the variable speed drive indicating when the actuator should run, what the speed should be, and when the motor should shut off, thereby controlling the position and speed of movement of the collection bin during vegetable harvesting.

2. The harvesting apparatus of claim 1, wherein the collection bin is provided with an internal conveyor for receiving the harvested vegetables, the automated control system moves the conveyor in accordance with the position and amount of vegetables collected and controls the speed of such movement, and the variable speed drive controls the position and speed of movement of the internal conveyor thereby repositioning the harvested vegetables in the collection bin while the collection bin remains stationary.

3. The harvesting apparatus of claim 2, wherein the automated control system further includes an electrohydraulic system comprising:

electrical signal lines A and B, a manual, mode-selector switch to designate a filling mode, an unloading mode or a manual override, wherein the manual, mode-selector switch provides an electrical signal to signal line A when the filling mode is chosen, an electrical signal to signal line B when the unloading mode is chosen, or no signal when the manual override mode is chosen, a four-way, three-position control valve, equipped with two solenoids, solenoid A and solenoid B, wherein solenoid A opens upon receiving an electrical signal from signal line A, solenoid B opens upon receiving an electrical signal from signal line B, signal line B providing an electrical signal to solenoid B when the unloading mode is chosen, and the control valve remaining in the closed position when no signal is received, one or more level sensors to detect the vertical height, at various positions, of the vegetables collected in the collection bin, wherein the level sensors provide corresponding electrical signals, a bin control switch provided in signal line A, normally in the open position during the harvesting operation, which receives signal input from the one or more level sensors, the bin control switch closing upon receiving a signal from the one or more level sensors when a threshold level has been reached in the collection bin, and opening again when the collection bin or internal conveyor has been repositioned to a new filling position, wherein signal line A provides an electrical signal to solenoid A when the filling mode is chosen and the bin control switch is closed, an hydraulic motor for moving the movably mounted collection bin or the internal conveyor, a power unit hydraulic system for providing power to the hydraulic motor, and hydraulic lines A and B, wherein each line connects the hydraulic flow from the power unit hydraulic system to the hydraulic motor when the respective solenoids are opened, and hydraulic line A contains at least one flow control valve to meter the flow of the hydraulic fluid and thus reduce the speed of the hydraulic motor, thereby controlling the position and speed of movement of the collection bin or internal conveyor during vegetable harvesting.

4. The harvesting apparatus of claim 3, wherein the power unit is an open center power unit.

5. The harvesting apparatus of claim 3, wherein the power unit is a closed center power unit.

6. The harvesting apparatus of claim 3, the electrohydraulic system further comprising:

an automatic shutoff switch in signal line A, normally in the closed position during the harvesting operation, which receives signal input from the one or more level sensors, the automatic shutoff switch opening upon receiving a signal from the one or more level sensors when the collection bin has been filled to capacity, wherein signal line A provides an electrical signal from the mode-selector switch to solenoid A when the filling mode is chosen and both the bin control switch and automatic shutoff switch are closed, thereby preventing repositioning of the collection bin and further filling of the collection bin.

7. The harvesting apparatus of claim 6, wherein signal line A additionally provides an electrical signal to a warning indicator when the bin control switch is closed and the automatic shutoff switch is open, thereby providing an indication that the collection bin has been filled to capacity.

8. The harvesting apparatus of claim 1, further comprising the following additional components connected to the tractor:

a vine elevating device;

an assembly for separating the vegetables from the elevated vines; and a transporting assembly for transporting the vegetables from the separating assembly to the collection bin.

9. The harvesting apparatus of claim 8, wherein the transporting assembly has an outlet for passing the harvested vegetables from the transporting assembly into the collection bin, and the automated control system moves the vegetables both relative to the frame and relative to the transporting assembly outlet.

10. The harvesting apparatus of claim 1, further comprising a root severing apparatus for severing the roots of the vegetables from the ground.

11. The harvesting apparatus of claim 1, wherein the vegetables harvested are cucumbers.

12. An apparatus for mobile harvesting vegetables, comprising:

a frame adapted to be connected to a tractor;

a collection bin movably mounted to the frame for collecting the vegetables as they are harvested; and an automated control system for moving the vegetables relative to the frame, for moving the collection bin in accordance with the position and amount of vegetables collected, and for controlling the speed of such movement, thereby repositioning the collection bin, wherein the automated control system is an electrohydraulic system comprising:

electrical signal lines A and B, a manual, mode-selector switch to designate a filling mode, an unloading mode or a manual override, wherein the manual, mode-selector switch provides an electrical signal to signal line A when the filling mode is chosen, an electrical signal to signal line B when the unloading mode is chosen, or no signal when the manual override mode is chosen, a four-way, three-position control valve, equipped with two solenoids, solenoid A and solenoid B, wherein solenoid A opens upon receiving an electrical signal from signal line A, solenoid B opens upon receiving an electrical signal from signal line B, signal line B providing an electrical signal to solenoid B when the unloading mode is chosen, and the control valve remaining in the closed position when no signal is received, one or more level sensors to detect the vertical height, at various positions, of the vegetables collected in the collection bin, wherein the level sensors provide corresponding electrical signals, a bin control switch provided in signal line A, normally in the open position during the harvesting operation, which receives signal input from the one or more level sensors, the bin control switch closing upon receiving a signal from the one or more level sensors when a threshold level has been reached in the collection bin, and opening again when the collection bin has been repositioned to a new filling position, wherein signal line A provides an electrical signal to solenoid A when the filling mode is chosen and the bin control switch is closed, an hydraulic motor for moving the movably mounted collection bin, a power unit hydraulic system for providing power to the hydraulic motor, and hydraulic lines A and B, wherein each line connects the hydraulic flow from the power unit hydraulic system to the hydraulic motor when the respective solenoids are opened, and hydraulic line A contains at least one flow control valve to meter the flow of the hydraulic fluid and thus reduce the speed of the hydraulic motor, thereby controlling the position and speed of movement of the collection bin during vegetable harvesting.

13. The harvesting apparatus of claim 12, wherein the power unit is an open center power unit.

14. The harvesting apparatus of claim 12, wherein the power unit is a closed center power unit.

15. The harvesting apparatus of claim 12, the automated control system further comprising:

an automatic shutoff switch in signal line A, normally in the closed position during the harvesting operation, which receives signal input from the one or more level sensors, the automatic shutoff switch opening upon receiving a signal from the one or more level sensors when the collection bin has been filled to capacity, wherein signal line A provides an electrical signal from the mode-selector switch to solenoid A when the filling mode is chosen and both the bin control switch and automatic shutoff switch are closed, thereby preventing repositioning of the collection bin and further filling of the collection bin.

16. The harvesting apparatus of claim 15, wherein signal line A additionally provides an electrical signal to a warning indicator when the bin control switch is closed and the automatic shutoff switch is open, thereby providing an indication that the collection bin has been filled to capacity.

17. The harvesting apparatus of claim 12, wherein the vegetables harvested are cucumbers.

18. The harvesting apparatus of claim 12, further comprising the following additional components connected to the tractor:

a vine elevating device;

an assembly for separating the vegetables from the elevated vines; and a transporting assembly for transporting the vegetables from the separating assembly to the collection bin.

19. The harvesting apparatus of claim 18, wherein the transporting assembly has an outlet for passing the harvested vegetables from the transporting assembly into the collection bin, and the automated control system moves the vegetables both relative to the frame and relative to the transporting assembly outlet.

20. The harvesting apparatus of claim 12, further comprising a root severing apparatus for severing the roots of the vegetables from the ground.

\* \* \* \* \*